(12) United States Patent
Natanzon et al.

(10) Patent No.: US 8,271,441 B1
(45) Date of Patent: Sep. 18, 2012

(54) VIRTUALIZED CG

(75) Inventors: Assaf Natanzon, Ramat-Gan (IL); Yuval Aharoni, Kfar-Saba (IL); Tzach Schechner, Tel-Aviv (IL); Oded Kedem, Tel-Aviv (IL)

(73) Assignee: EMC Corporation, Hopkinton, MA (US)

( * ) Notice: Subject to any disclaimer, the term of this patent is extended or adjusted under 35 U.S.C. 154(b) by 265 days.

(21) Appl. No.: 12/647,450

(22) Filed: Dec. 26, 2009

(51) Int. Cl.
G06F 7/00 (2006.01)
G06F 17/00 (2006.01)
(52) U.S. Cl. .......................................................... 707/634
(58) Field of Classification Search .................... 707/634
See application file for complete search history.

(56) References Cited

U.S. PATENT DOCUMENTS
2007/0220311 A1* 9/2007 Lewin et al. ..................... 714/6
* cited by examiner Primary Examiner — Robert Beausoliel, Jr.
Assistant Examiner — Nicholas Allen
(74) Attorney, Agent, or Firm — Krishnendu Gupta; Joseph D'Angelo

(57) ABSTRACT

A method, system, and program product for use in a data replication environment, the data replication environment comprising a plurality of data protection appliances, each data protection appliance of the plurality of data protection appliances comprising a journal, the method comprising creating a virtual consistency group comprising a virtual journal; wherein the virtual consistency group is configured to replicate a production volume, dividing the virtual consistency group into segments; wherein each segment corresponds to a portion of the production volume and a portion of the virtual journal, and assigning each data protection appliance of the plurality of data protection appliances a segment of the virtual consistency group.

20 Claims, 15 Drawing Sheets

- VIRTUALIZES A PORTION OF THE VCG — 1110
- READ RELEVANT DIRTY AREAS FROM THE MARKING STREAM — 1120
- FLUSHES OPEN SPLITTER IOs — 1130
- READS FROM THE PORTION TO BE REPLICATED — 1140
- ADD NEW IOs TO THE MARKING STREAM — 1150

FIG. 11

VIRTUALIZED CG

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and program product for use in a data replication environment, the data replication environment comprising a plurality of data protection appliances, each data protection appliance of the plurality of data protection appliances comprising a journal, the method comprising creating a virtual consistency group comprising a virtual journal; wherein the virtual consistency group is configured to replicate a production volume, dividing the virtual consistency group into segments; wherein each segment corresponds to a portion of the production volume and a portion of the virtual journal, and assigning each data protection appliance of the plurality of data protection appliances a segment of the virtual consistency group.

DESCRIPTION OF DRAWINGS

The above and further advantages of the present invention may be better under stood by referring to the following description taken into conjunction with the accompanying drawings in which:

BRIEF DESCRIPTION OF THE DRAWINGS

Figure 1:
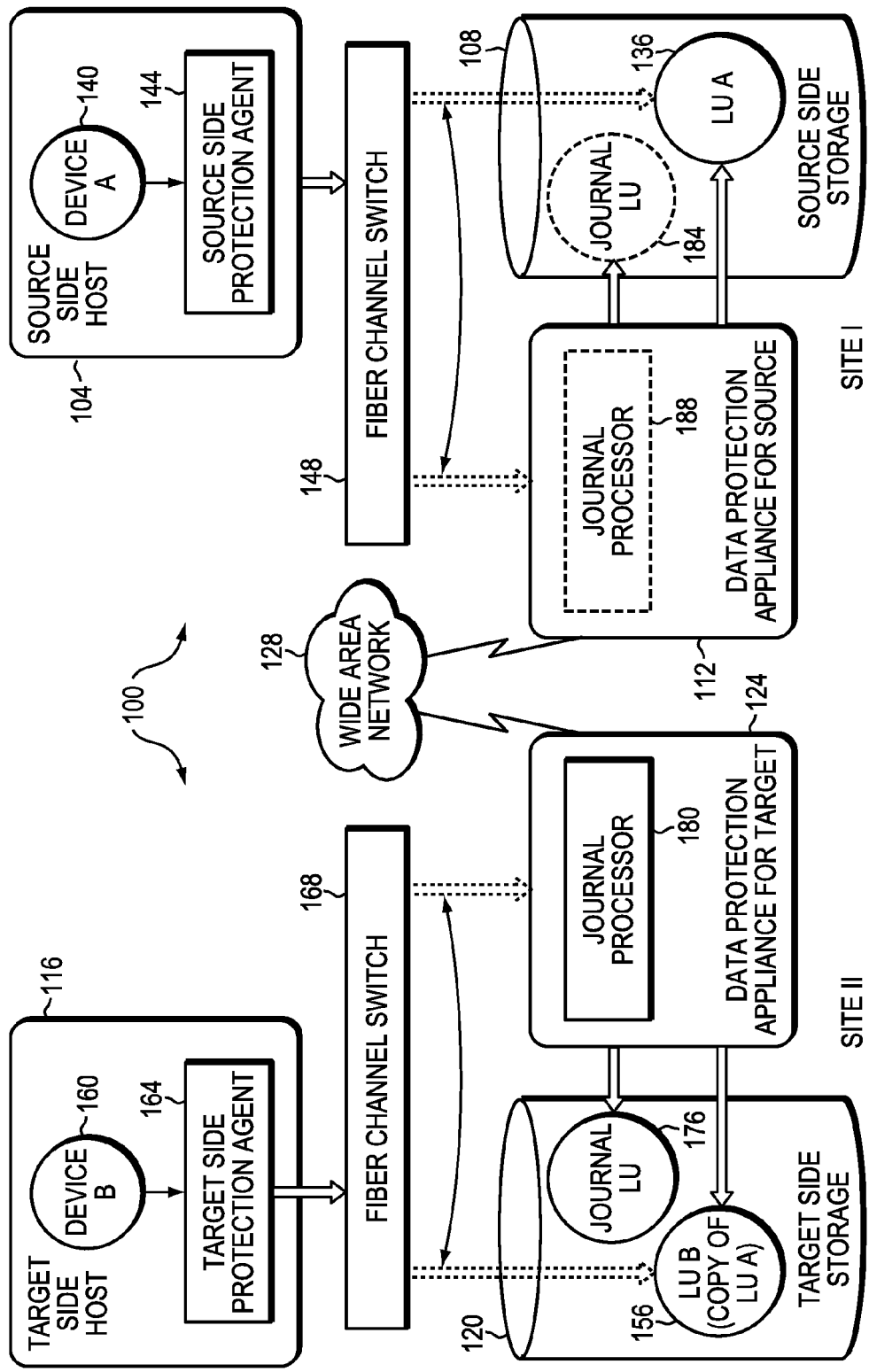
Figure 2:
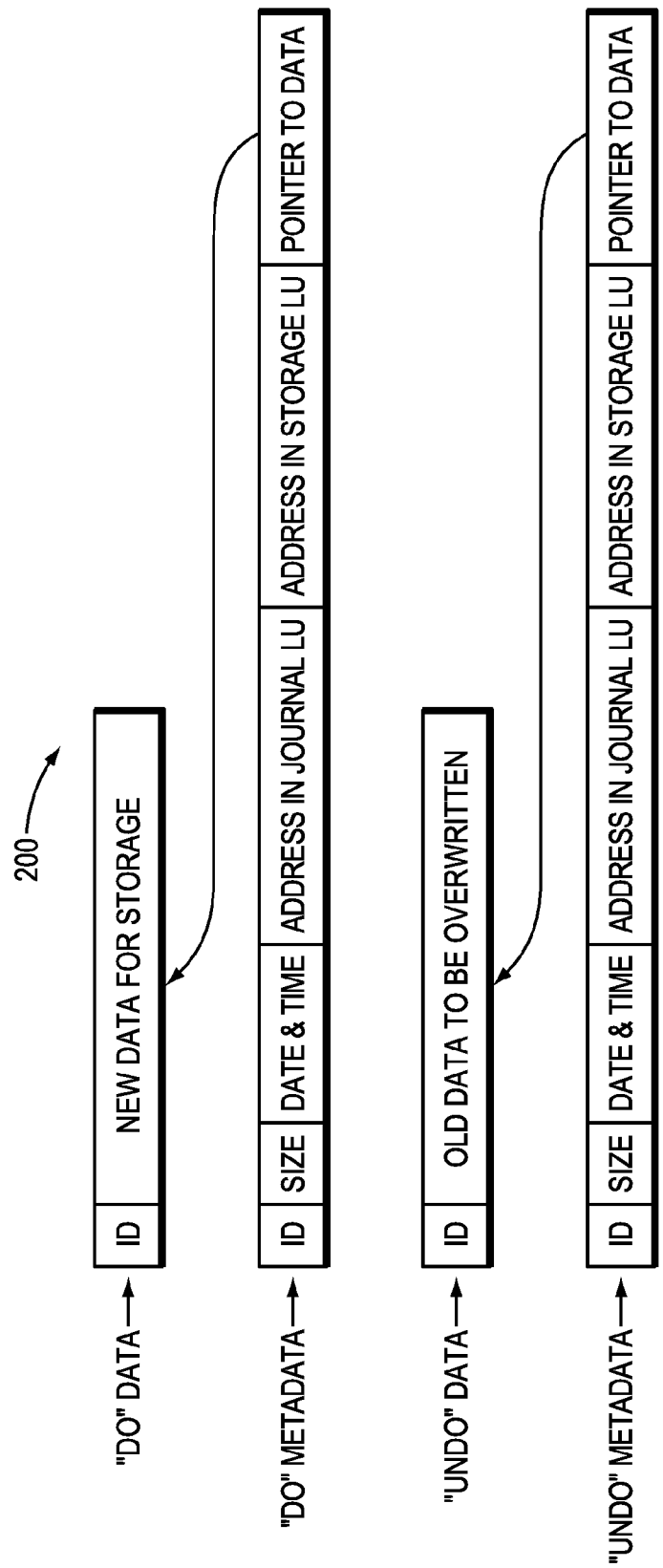
Figure 3:
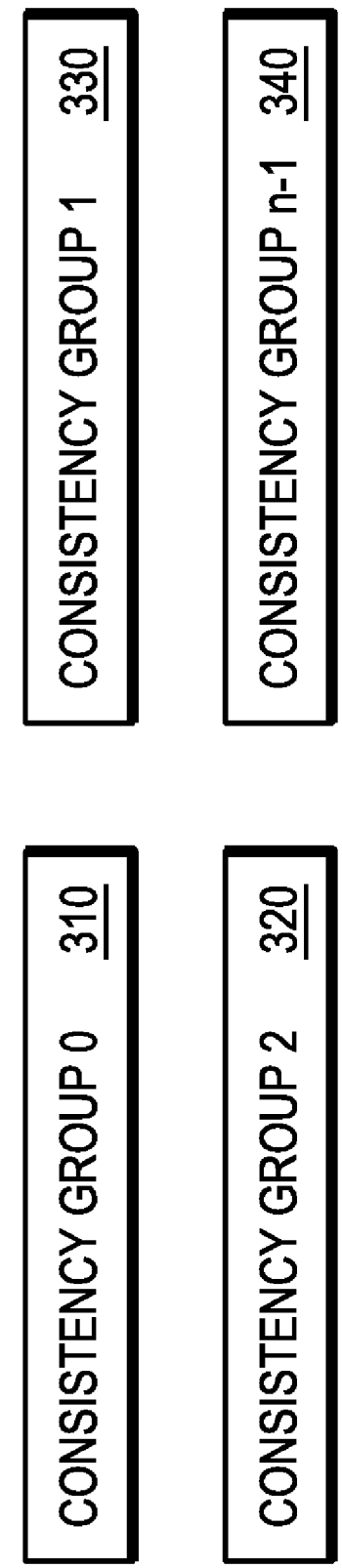
Figure 4:
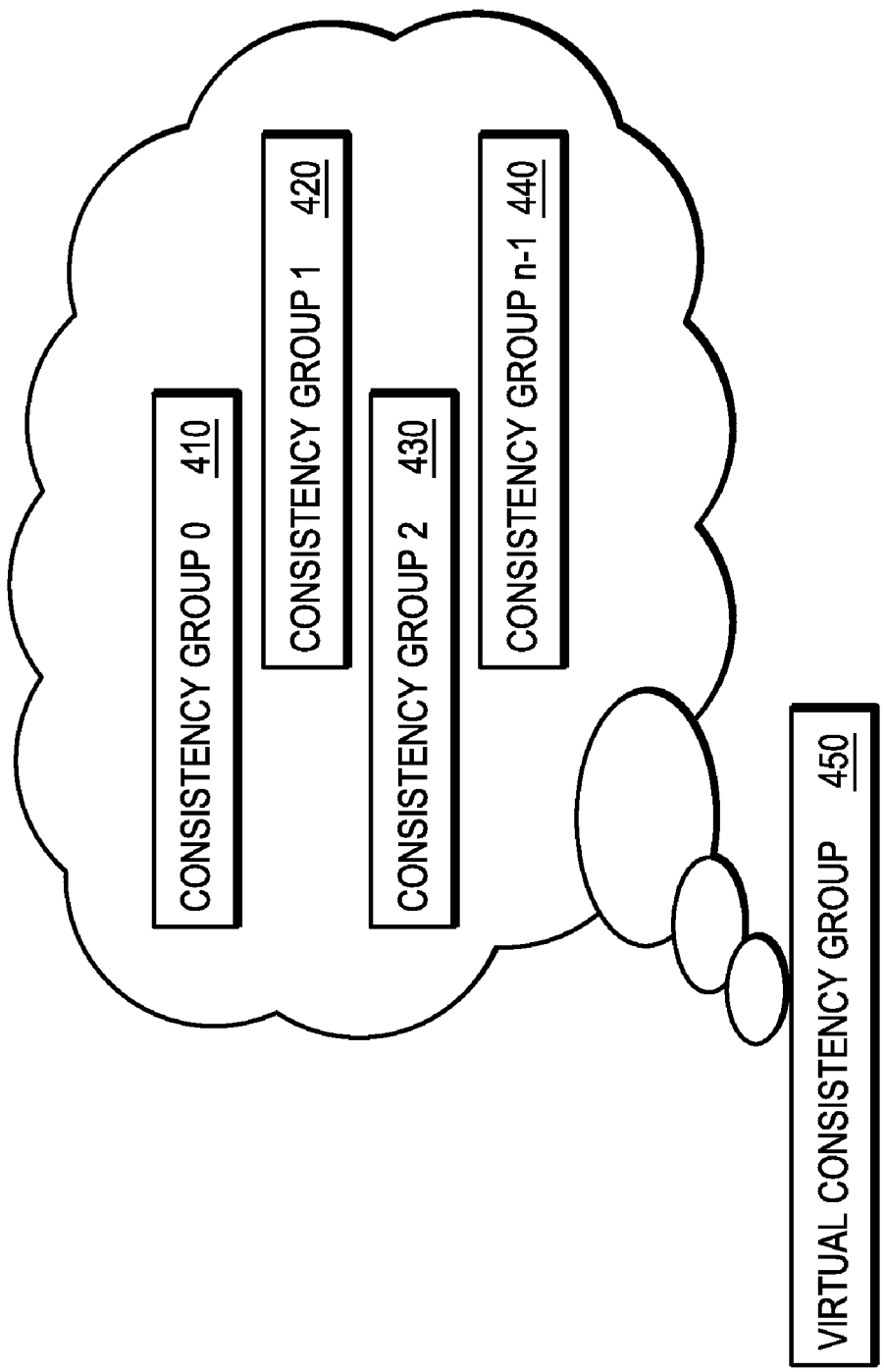
Figure 5:
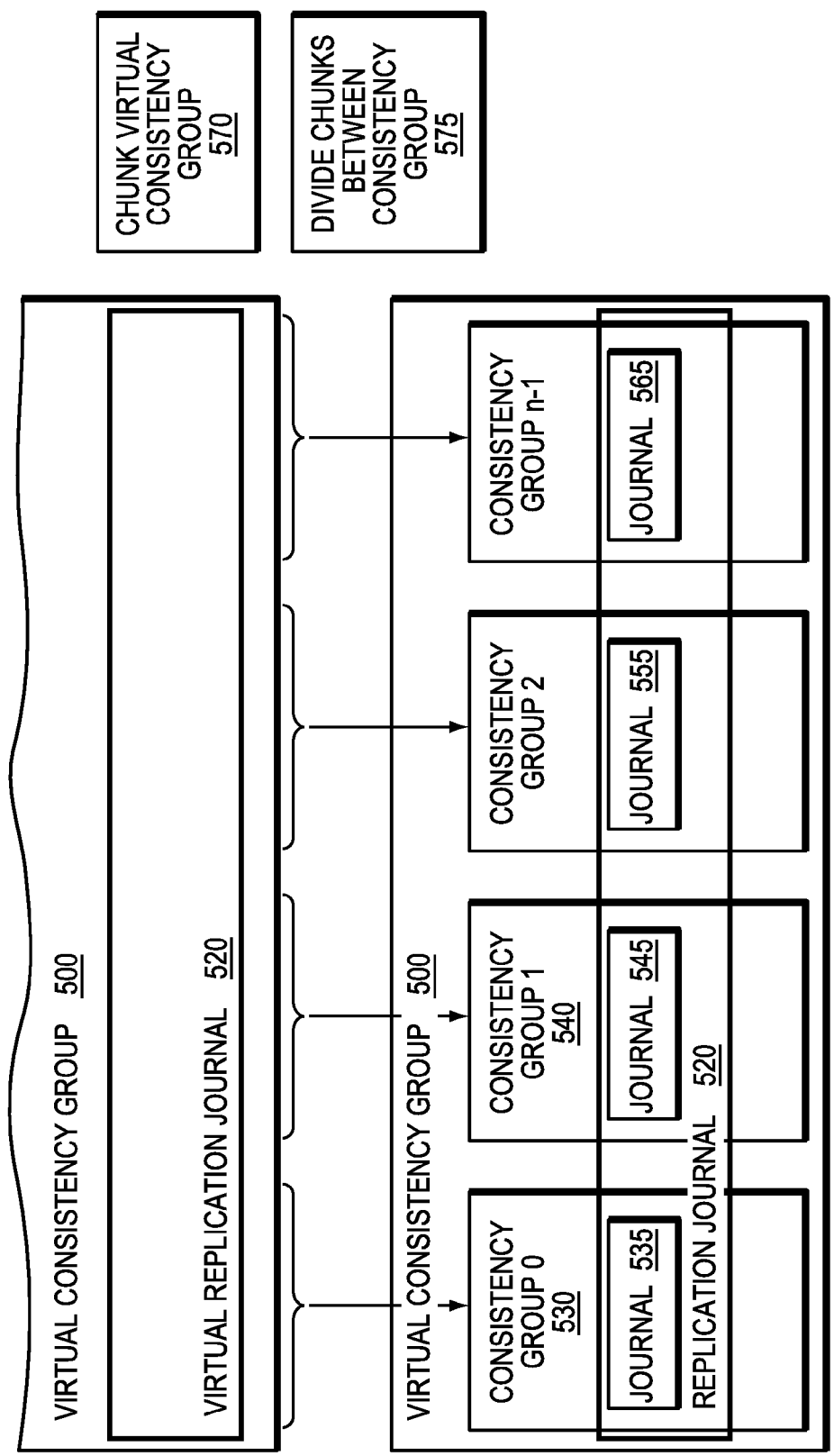
Figure 6:
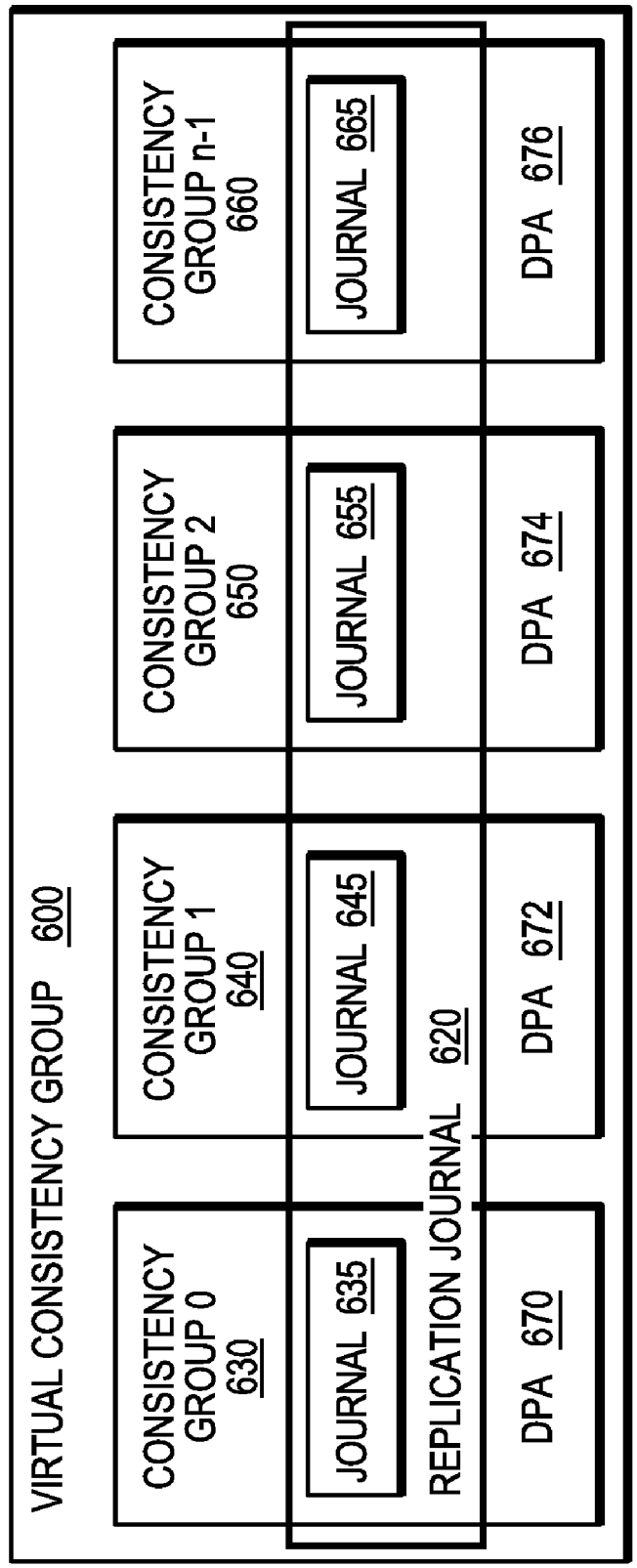
Figure 7:
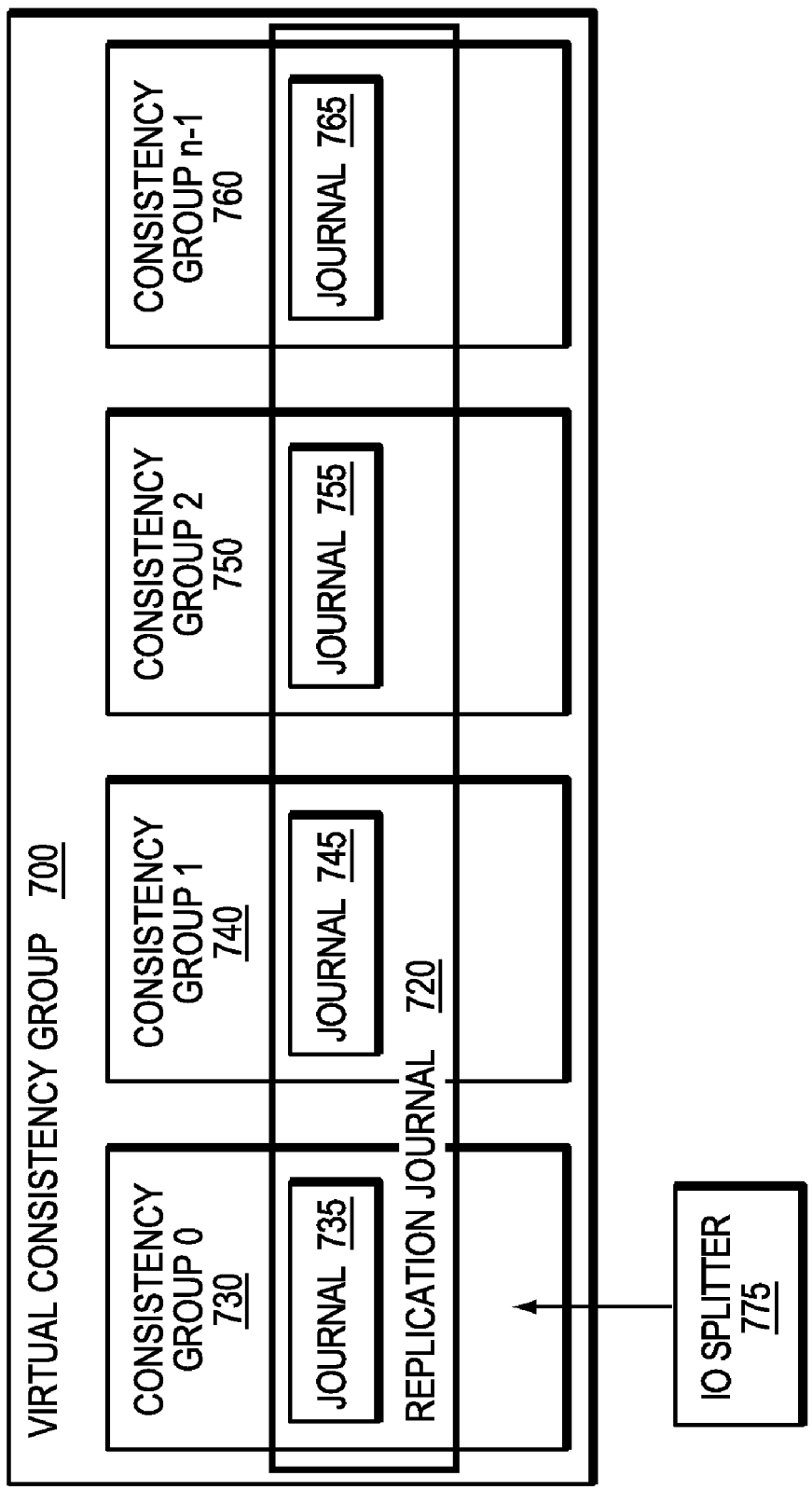
Figure 8:
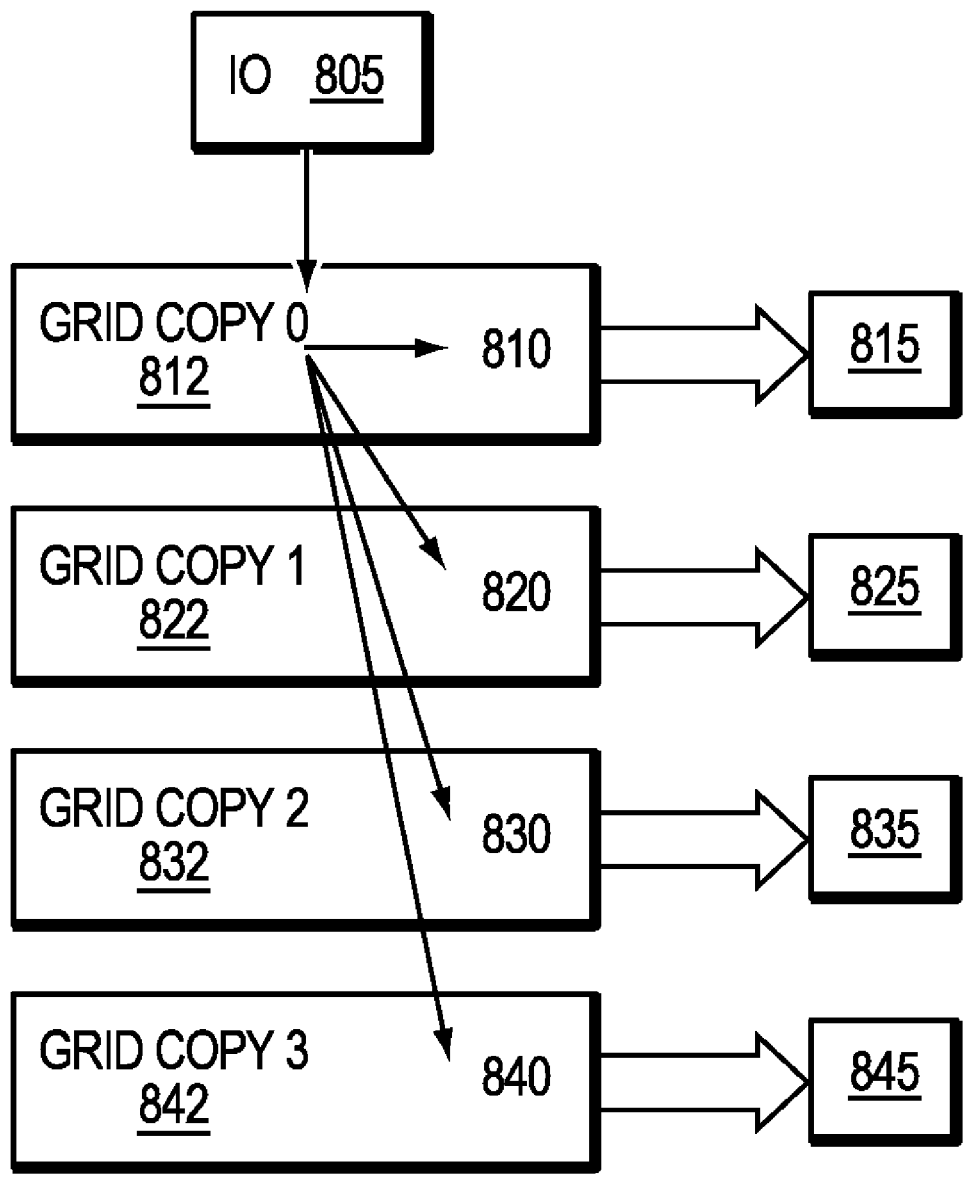
Figure 9:
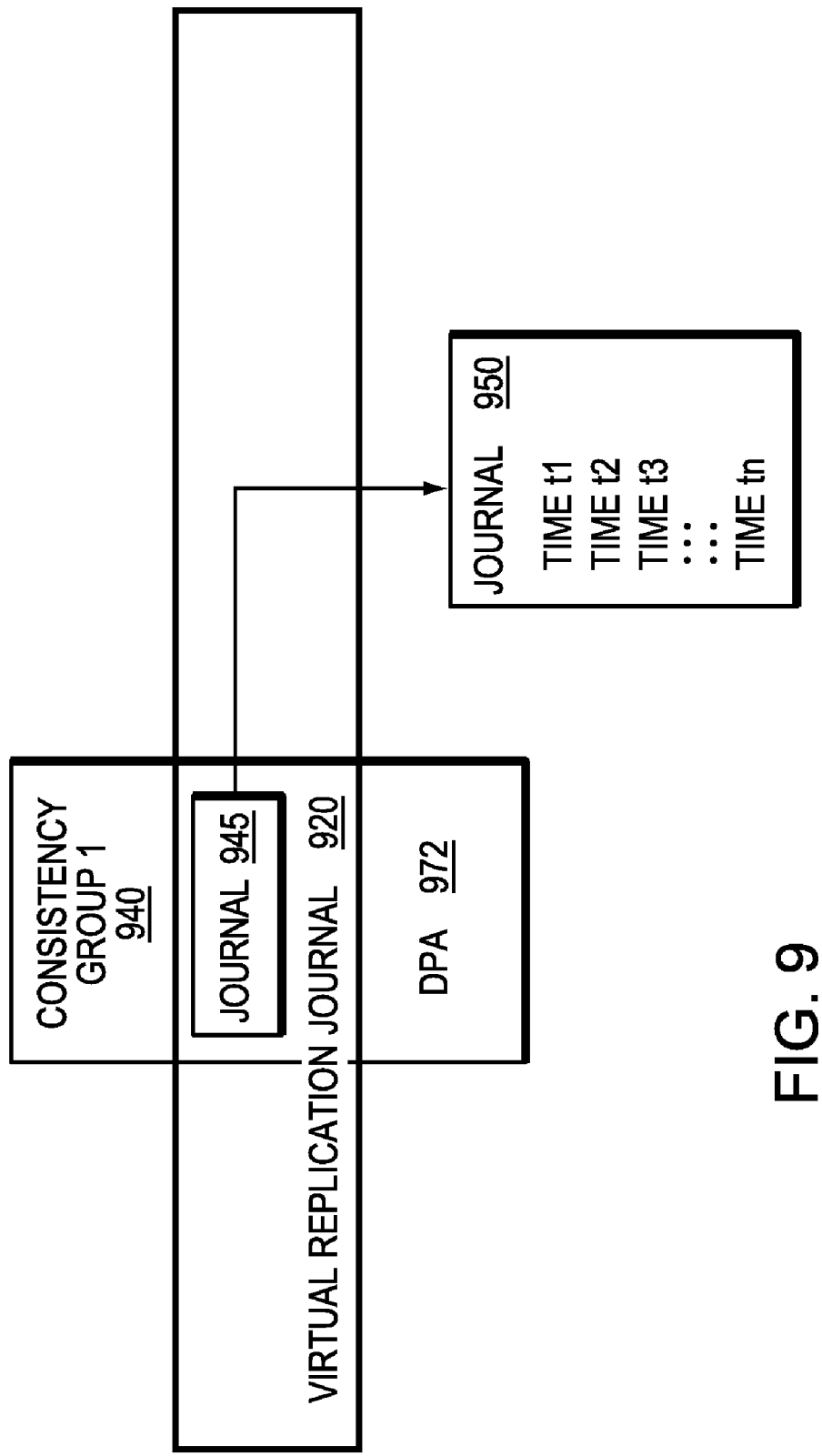
Figure 10:
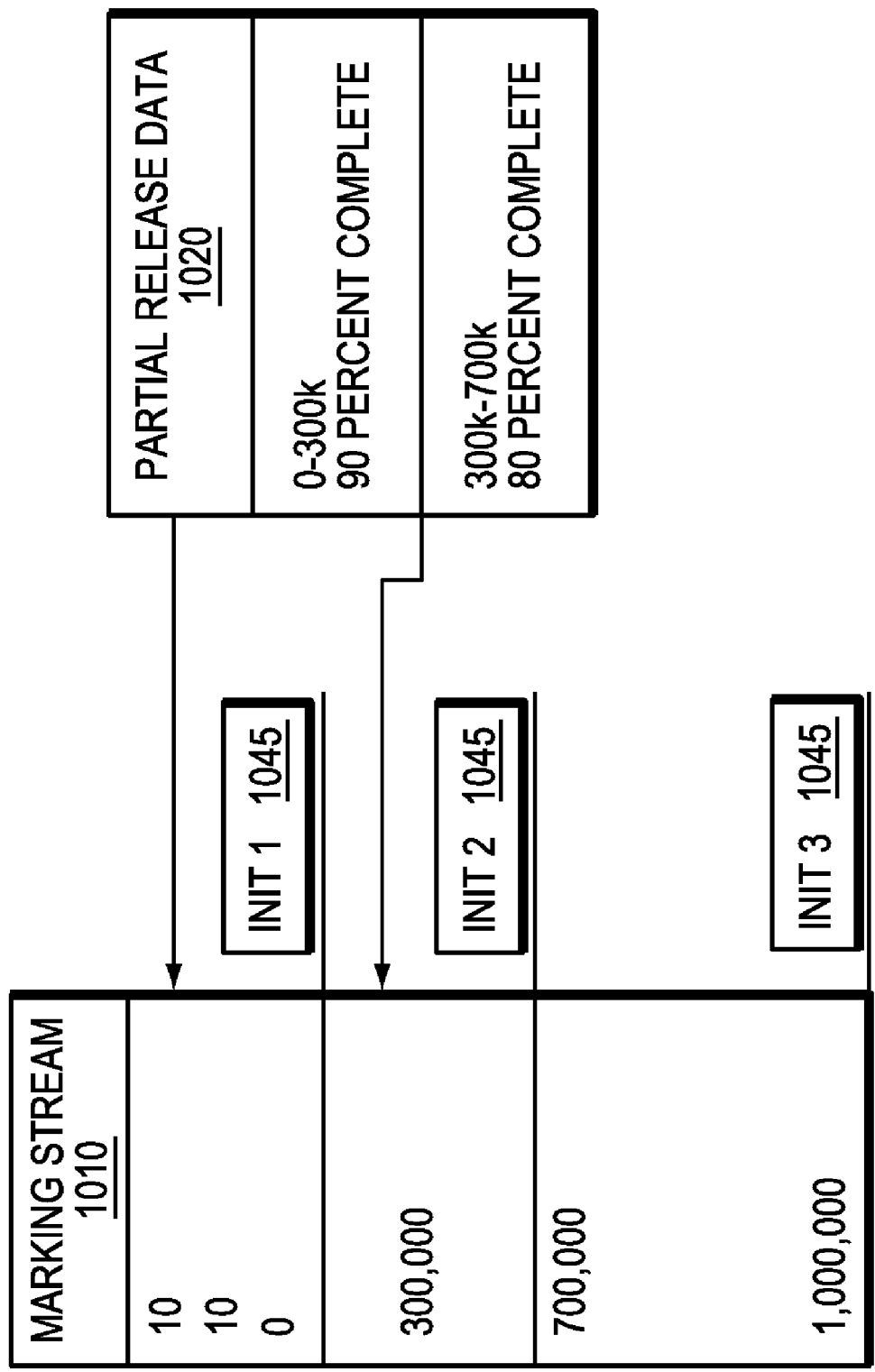
Figure 12:
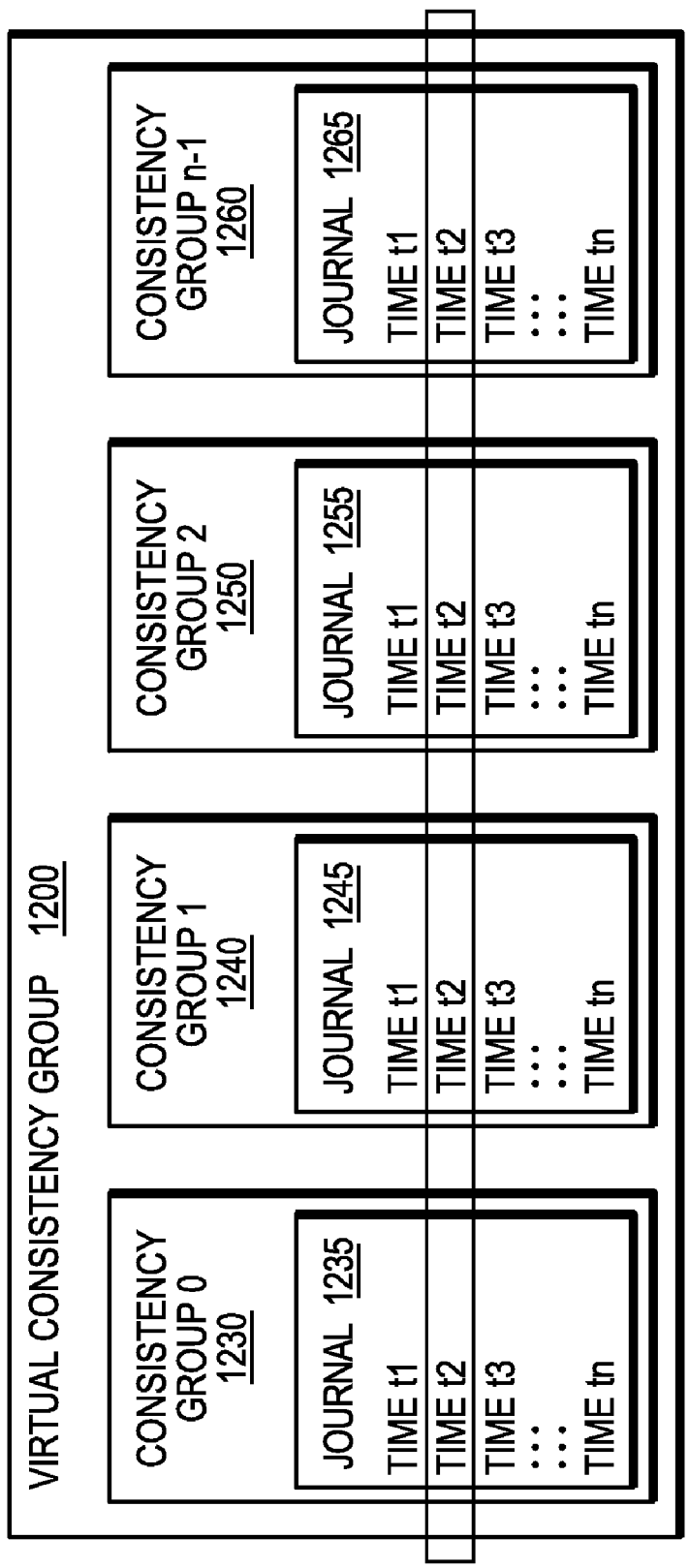
Figure 13A:
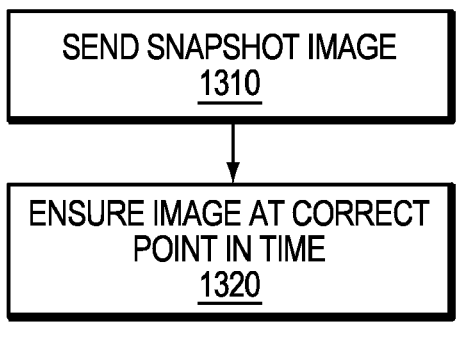
Figure 13B:
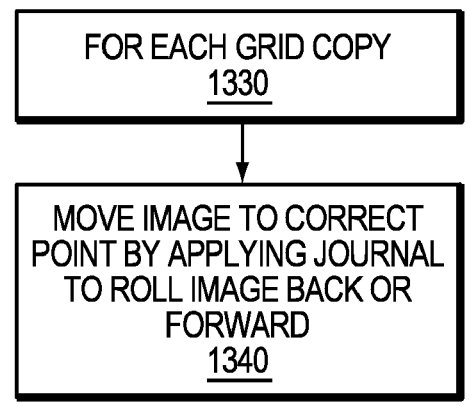
Figure 14:
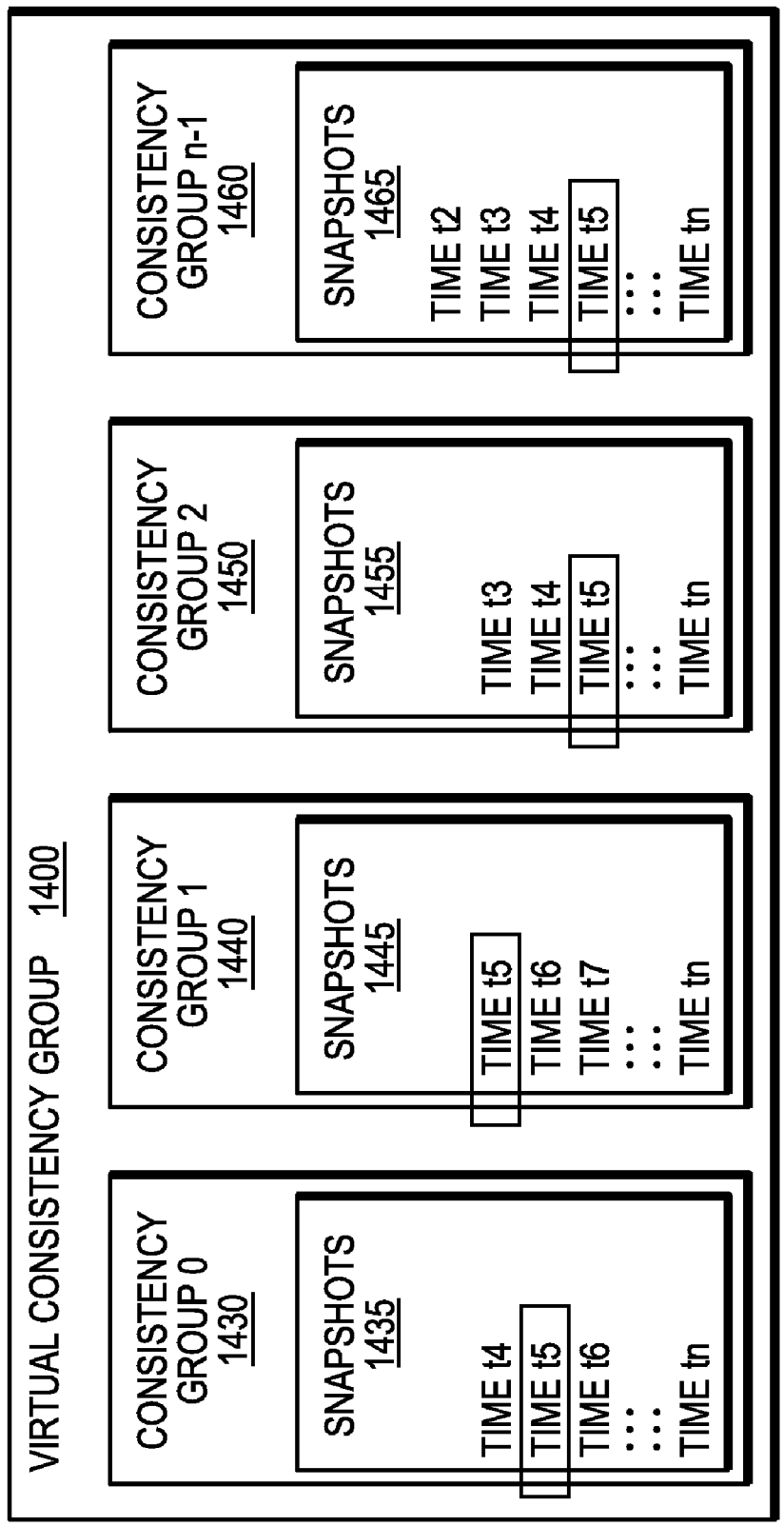
Figure 15:
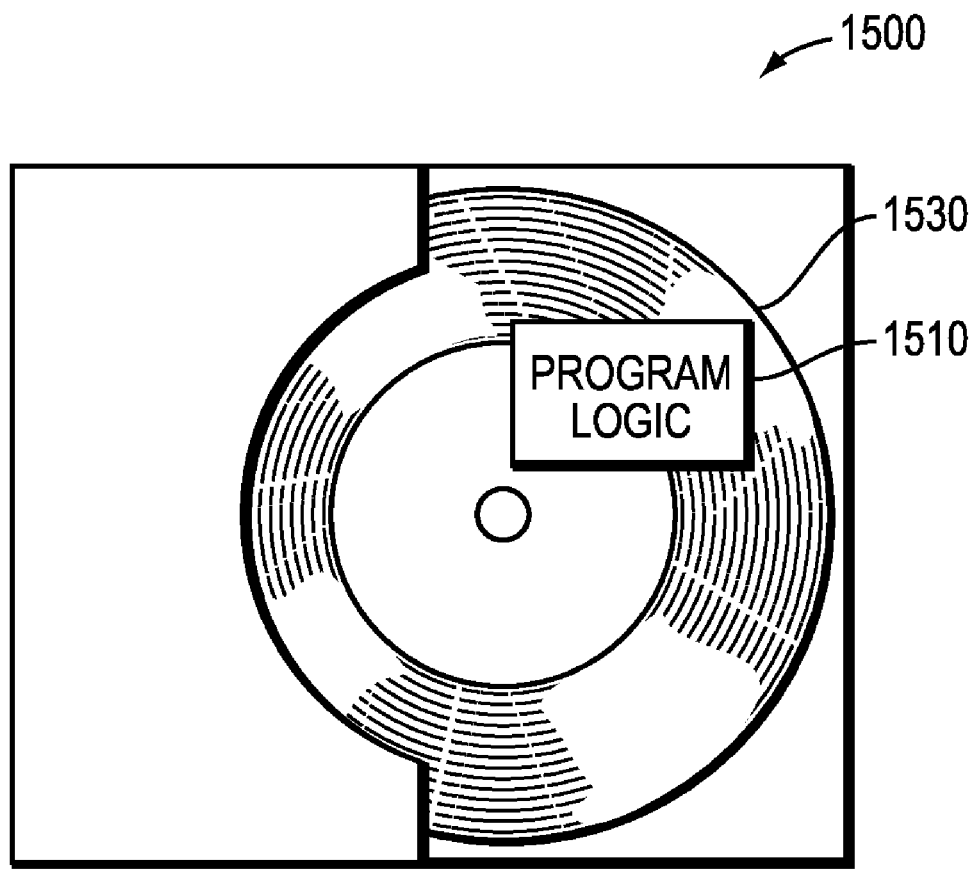

The present invention will be more fully understood and appreciated from the following detailed description, taken in conjunction with the drawings in which:

FIG. 1 is a simplified block diagram of a data protection system, in accordance with an embodiment of the present invention;

FIG. 2 is a simplified illustration of a journal history of write transactions for a storage system, in accordance with an embodiment of the present invention;

FIG. 3 is a simplified block diagram of a consistency groups according to an embodiment of the present invention;

FIG. 4 is a simplified block diagram of a virtual consistency group according to an embodiment of the present invention;

FIG. 5 is an alternative embodiment of a simplified block diagram of a virtual consistency group according to an embodiment of the present invention;

FIG. 6 is further alternative embodiment of a simplified block diagram of a virtual consistency group according to an embodiment of the present invention;

FIG. 7 is a simplified block diagram of a virtual consistency group receiving IO according to an embodiment of the present invention;

FIG. 8 is an alternative embodiment of simplified block diagram of a virtual consistency group receiving IO according to an embodiment of the present invention;

FIG. 9 is a simplified block diagram of a time stamps on the journal of a gird copy according to an embodiment of the present invention;

FIG. 10 is a simplified block diagram of partial release data according to an embodiment of the present invention;

FIG. 11 is a simplified flowchart of an initialization method in accordance with an embodiment of the present invention;

FIG. 12 is a simplified block diagram of time stamps across grid copies of a virtual consistency group according to an embodiment of the present invention;

FIG. 13a is a simplified flowchart of a method of saving a point in time snapshot, in accordance with an embodiment of the present invention;

FIG. 13b is a simplified flowchart of a method of creating a point in time snapshot, in accordance with an embodiment of the present invention;

FIG. 14 is a simplified block diagram of an alternative embodiment of time stamps across grid copies of a virtual consistency group according to an embodiment of the present invention; and FIG. 15 is an embodiment of the current invention stored on a computer readable medium.

DETAILED DESCRIPTION

In an embodiment, the current disclosure enables replication of one consistency group across several replication appliances. In an embodiment, volumes may be striped. Each volume may be presented as a set of stripes striped volume. A new virtual CG may be created which may consist of several internal CGs. The virtual CG may be presented to the user and the user may be able to perform all actions on the virtual CG. Internally, in some embodiments, each internal CG may replicate only some of the stripes of the volumes. As well a consistency point may be achieved across internal CGs. That is, it may be possible to create an image of a particular time by rolling each internal CG group to that time. In some embodiments, the internal CGs may not be exposed to the user and all actions happen automatically on the internal CGs when performed on the virtual CG. Internal CG groups may also be referred to as Grid Copies.

In a further embodiment, one box may be accepting all the IOs, this box will split the IOs between relevant boxes running the consistency groups.

Typical replication technologies either run in the array or run on network or host. Conventional array based technologies are limited to the internal array and are homogenous, network technologies limited to replicating whole luns. The typical arrays have trouble replicating a high performance environment in a single consistency group, or have trouble with real time load balancing. Current host based replication is usually limited intrusive and cannot replicate data shared in clusters. Conversely, the current specification, in some embodiments, enable load balancing though the volume virtualization and enables high performance replication using clusters of replication devices.

The following definitions may be useful in understanding the specification and claims.

BACKUP SITE—a facility where replicated production site data is stored; the backup site may be located in a remote site or at the same location as the production site;

DPA—a computer or a cluster of computers that serve as a data protection appliance, responsible for data protection services including inter alia data replication of a storage system, and journaling of I/O requests issued by a host computer to the storage system;

Grid MCG: a Consistency group that may be replicated across several RPA this is the Consistency Group that is presented to the user Grid ICG: a part of the grid Consistency Group that is replicated by one RPA Marking Box: the RPA that runs the grid ICD which accepts all the data and splits it to the relevant boxes.

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SPLITTER ACKNOWLEDGEMENTS—an acknowledgement from an RPA to the protection agent that data has been received at RPA, this may be achieved by SCSI status cmd.

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

REMOTE ACKNOWLEDGEMENTS—an acknowledgement from remote DPA to the local DPA that data arrived at the remote DPA (either to the appliance or the journal)

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

Embodiment of a Replication System

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network, and that DPAs are optional and DPA code may run on the storage array too.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system or on the storage system itself.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields: one or more identifiers;

a time stamp, which is the date & time at which the transaction was received by source side DPA 112;

a write size, which is the size of the data block;

a location in journal LU 176 where the data is entered;

a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

Virtualized Consistency Groups

In an embodiment, the invention enables use of a virtualized Consistency Group to present a single Consistency Group which may span several different appliances. In some embodiments, creating one large consistency group is achieved by n internal consistency groups or grid copies. Each grid copy may have the same configuration as the original consistency group, i.e. user volumes and journal volumes. Each internal CG may be called a Grid Copy.

The grid copies may be numbered 0, . . . , n−1 where grid copy zero may be a special grid copy. For example refer to the embodiment of FIGS. 3 and 4. FIG. 3 illustrates a sample internal consistency groups or grid copies, consistency group 310, 320, 330 and 340. The embodiment of FIG. 4 illustrates how these consistency groups 410, 420, 430, and 440 may be used to create a virtual consistency group 450. Referring now to the embodiment of FIG. 5, a Virtual Consistency group 500 is shown. This Virtual consistency group 500 may have a virtual replication journal 520 and may be presented to the user. In some embodiments, the virtual journal, such as virtual journal 520 may be created by the user. The Virtual Consistency group may include several consistency groups or grid copies, such as grid copies 530, 540, 550, and 560. These grid copies may each be responsible for a portion of the replication handled by the consistency group. As well, each grid copy may have a journal, such as journals 535, 545, 555, and 565 which may correspond to a piece or segment of the replication journal 520 of the virtual consistency group 500. The user volumes of consistency group 500 are chunked 570 and divided 575 between the grid copies.

Referring to the embodiment of FIG. 6, each grid copy can run on a different Data protection appliance such as DPA 670, 672, 674, and 676. As well, a DPA may run multiple grid copies. Each grid copy may contain a portion of the virtual replication journal 620 for a replication of a volume or multiple volumes. That is, each grid copy, 630, 640, 650, and 660 may be responsible for recording a portion of the journal 620, which corresponds to a portion of the replication of the Virtual replication Group 600. Replication of user volumes may be divided into sections and each grid copy, 630, 640, 650, and 660 may be responsible for an equal section, each grid copy may be responsible for replicating its portion of the user volumes and every grid copy may create its own journal curved from the global journal. The grid copy may use the piece of the journal corresponding to that section, such as Journals 635, 645, 655, and 665, to create do stream and undo stream for each section.

Referring to the embodiment of FIG. 7, grid copy zero may be different from other grid copies as it may manage the accounting for virtual consistency group. That is, all IO from the splitter may be directed to the grid copy zero. Further, the virtual consistency group may be used for replication of a single volume. As well, the virtual consistency group may be used to replicate multiple volumes. In an embodiment, the virtual consistency group may represent any number of underlying consistency groups, grid copies, or DPAs, however the virtual consistency group may be presented to the user as a single consistency group.

Splitting of the Data

Referring to the embodiment of FIG. 7, all IOs from the splitters may arrive at grid copy zero 730. This grid copy 730 may handle the marking of the data, where marking may mean the tracking of changes to the data. The user volume or volumes to be replicated by the virtual consistency group may be divided into chunks, where each chunk may be handled by a different grid copy of the virtual consistency group. In some embodiments, grid copy zero may be responsible for sending the IOs to the correct grid copy, the grid copy group may also handle the IO. The grid copy group may compress the data and may send it to the replica site where it may be written to the relevant journal. This may include grid copy zero splitting IOs into two or more parts when necessary.

Referring to the embodiment of FIG. 8, IOs 805 reach appliance 810 of grid CG 0. Grid copy zero 812 receives the IO 805. Grid copy zero 812 may send the IO it to the DPAs, such as DPA 820, 830, and 840, which hold the grid CGs 822, 834, and 842, relevant to the IO. In some embodiments a single DPA may store multiple grid copies and IO for the multiple grid copies may be sent to a single DPA. Each grid copy may handle the IO, for example compress the IO and sending the IO to remote, such as remotes 815, 825, 835, and 845, and on the remote site write it to journal. As well, IOs may be transferred from grid copy zero to other grid copies on a first medium, for example small computer system interface (SCSI) over fiber channel, and data from each grid copy to its replica counterpart may be transferred on another medium such as Internet Protocol (IP), or vice versa.

In some embodiments, a marking stream may be a stream of meta data, containing volume ID, offset and length. The marking stream may be used to track the difference between a production and a replica site, allowing to resynchronization of portions of the data, in case the replication process stopped, for example because of a wan problem or other problem causing connectivity problems. The meta data stream may be persistently stored on the journal of the production site. The marking stream may be maintained by grid copy 0.

Freeing data from the marking stream may be done when data arrives to both production and replica copies, thus data can be freed from the marking stream, when data reaches the production storage and all remote virtual CGs, the algorithm will free until the minimum of the point is reached in the remote copies.

Bookmark Creation:

In further embodiments, the grid copy zero may also responsible for creating consistent points in time bookmarks across all the grid copies, grid copy zero may do so by sending a message every second to all grid copies with the same time stamp. The message may arrive to all grid copies and creates a barrier which may enforce consistency. A bookmark may be created by adding a small message to the journal of each grid copy.

For example, in some embodiments, grid copy zero will send a time stamp to each grid copy. Each grid copy may use this time stamp to mark time in the journal for that grid copy. As well, each grid copy may use this time stamp to roll forward and backward in the journal. That is, the time stamp allows the grid copy to apply do and undo meta data to reach a particular image for the portion of the replication it maintains. As well, bookmarks may also be created on user demand.

Journal:

For a replicated volume or volumes, the journal for the replication may be striped across each grid copy. The journal volumes may create a virtual striped space, each grid copy may get specific portions of the space, on which the grid copy may handle its journal. As well, the journal of each grid copy may manage its own list of snapshots. Referring back to the embodiment of FIG. 5a, the Virtual Consistency group 500 has a virtual journal 520. The virtual journal 520 may be made up of the journals 535, 545, 555, and 565 of the grid copies 530, 540, 550, and 560. Referring again to FIG. 5a, each grid copy may maintain a journal which corresponds to a segment of the virtual journal.

Referring to the embodiment of FIG. 9, each journal, such as journal 950, on a grid copy, such as grid copy 940, may keep track of time increments for the journal. This allows each grid copy to roll the replication image forward and backward to reach a particular image. In some embodiments, when all grid copies of a virtual consistency group rolls the image back to a particular point in time Tz, the virtual consistency group may present the image of the replication for the virtual consistency group at time Tz. In some embodiments, the timestamps may be maintained within the journal do and undo streams.

Initialization:

In an embodiment, the initialization process may be independent for each grid copy of the Virtual Consistency group. Each grid copy may perform the initialization at a different rate, depending on the resources present on the appliance on which the grid copy is running. In some embodiments, each grid copy may have partial release information for each copy in the delta marking. The partial release information may denote the status reached in the initialization for that grid copy. If the initialization were to fail or crash, when the initialization is restarted, the copy may use the partial release information to resume the initialization from the point it reached before failure.

Referring to the embodiment of FIG. 11, initialization may have each grid copy virtualizes 1110 the area it is responsible for replicating. For example, if a single volume is being replicated, this volume may be split between the number of grid copies, where each grid copy may receive an equal amount of the volume to replicate. If there are two grid copies, each grid copy may get half the volume, if there are four grid copies, then each grid copy may replicated one fourth of the volume. If there are multiple volumes or consistency groups to be replicated, then each the information to be replicated may still be divided between each of the grid copies.

In an embodiment, each grid copy may read 1120 the relevant dirty areas from the marking stream of grid copy zero, for the portion of the volume or volumes it is currently synchronizing. The marking stream may contain the portion of the replication that has changed and needs to be updated. As well, each grid copy may only read the portion of the marking stream that corresponds to the portion of the replication which it is replicating.

In some embodiments, each grid copy may flush 1130 open splitter IOs, so that all newer IOs will reach the grid copy while initializing. This will enable each grid copy to know all the dirty portions of the replication. In further embodiments, after the flushing is done, the grid copies may start reading 1140 local volumes independently from grid copy zero.

In another embodiment, new IOs may be added 1150 to the marking stream of copy 0. In other embodiments, the partial release info may be saved per grid copy as the initialization progresses and may includes the virtual location reached during the initiation process and what location was reached in the marking stream.

Take a simplified embodiment, where an initialization was occurring and there were only 2 consistency groups in the virtual consistency group. In this embodiment, consistency group 0 had processed 60 percent the initialization while Consistency group 1 had processed 20 percent of the of the initialization task. When the initialization is restarted, consistency group 0 may continue where it left off using the partial marking and need no processes the 60 percent that it had already processed. As well, consistency group 1 may start processing at the remaining 80 percent that it has not yet processed. In addition, since the crash, new IO may have been recorded. Each consistency group will recognize and process this additional IO as well. The partial release may have two dimensions: the point up to which the marking stream has completed the init and the portion of the volumes completed, the partial release info may contain several points for each CG.

Refer to the embodiment of FIG. 10. During a first initialization, the partial release info may indicate that the initialization completed 90% of the volume until entry 300,000. During a second initialization 80% may have been completed until entry 700,000. During initialization 2, the dirty entries from the marking stream 1010 may be read, each entry in the first 300,000 which is in the first 90% of the volume will be ignored. During an initialization 3, each entry which is in location 300,001 to 700,000 which is in the first 80% of the volumes will be ignored, all entries from 700,001 will be sent to replica.

In the embodiment of FIG. 10, the partial release info 1020 may contain a list of pairs, the size of the list is up to the number of times the initialization failed to complete. In the first initialization, which finished 90% when it crashed, the number of entries at the time of the crash was around 300,000 (the 90%, 300,000) is what may have been acknowledged. The second initialization ignored IOs in the first 300,000 entries of the marking stream which are to the first 90% offset of the volumes replicated. The second init completed 80% and the number of entries during the crash was 700,000. There may have been more marking entries, but acknowledgements were received for synching 80% of the first 700,000. A further initialization may have been started and reached 85% completion.

The entry list is for these three initializations may be 1.90%, 300,000, 2.80%, 700,000, and 3.85%, 1,100,000. Entry 3 may mean that all entries which are in the first 1,100,000 entries, which offset is less then 85% of the volume can be ignored, which include entry 2, but not cover all entry 1, if for instance the last init got to 91%, then entry 1 may also be obsolete.

Image Accessing:

In some embodiments, to access an image of the virtual consistency group, each grid copy may need to create an image the same point in time. Referring to the embodiment of FIG. 13 a, a snapshot message may be sent 1310 to all grid copies. Each grid copy may ensure 1320 that it is at the same correct point of time to create a consistent remote image. In some embodiments, accessing a point in time may require that each grid copy roll the image to the appropriate bookmark in the journal of the grid copy.

After the image is created, user may access the volume in virtual or logged access mode In an embodiment the image and the access point may be created in logged accessed mode, where mode read IOs may be sent from the directly to the volume, while write IOs may be sent to grid copy zero, which will forward the IO to the correct grid CG or split the IO to several parts sending them to the relevant Grid CGs, if IO corresponds to areas in the volume handled by more than one grid CG. When IO handling is completed the grid copy (i.e. the undo data of the IO was written to the logged access undo journal) may tell grid copy zero that IOs completed and grid copy may return the SCSI status command to the splitter which will be able to complete the IO, if the IO was split to several grid Copies, the status will be returned only when all grid copies completed handling it.

In virtual access mode both reads and writes of the volume may be redirected to grid copy zero, which may redirect the IO to the correct grid copy, which may complete the IO, acknowledge grid copy zero, which may return the SCSI status back. In some embodiments, one IO may be split to several IOs, if the IO is to locations which are handled by more then one grid copy. For example if the grid stripe length is 1 MB, and IOs with size more than 1 MB arrived, the IO may be split to more then one grid copy. Also an IO of size of two blocks may be split if it is written to a boundary between grid copies The status command in TSP and virtual mode may also achieved by a bound, since many IOs may arrive from the splitter in parallel in access mode, the DPA may give each logged/virtual access 10 a timestamp, a status for the IO may be return only when all IOs will lower timestamps completed, otherwise the status command will be delayed.

Bookmarks:

For example, using a 1 second granularity a message be send for every second, and each grid copy may place a bookmark in the journal copy corresponding to this point in time. When a request for a particular point in time is received, the grid copy may create an image for this request by rolling forward or backward in the journal based on the point.

For example, refer to the embodiment of FIG. 10. In this figure, it is desired to have an image from time T=2. This may mean it is necessary to have each consistency group roll the image either forward or backward in time to create an image at time T=2. In FIG. 10, time T=2 has been highlighted and all consistency groups may apply the journal streams to arrive at time T=2.

Snapshot List:

The DPA may hold a list of n selected snapshots, where n=1000. As there may be many grid copies in the virtualized CG, each grid copy may hold a different list of 1000 snapshots. The presented list of snapshots may be the intersection of the list of snapshots of all the grid copies. This may be because the list of 1000 snapshots is a selected list and it may be necessary to make sure the selection algorithm of each copy works the same. During a disaster, a message may arrive at one grid copy and not another. In this case, it may not be assumed that the lists are identical. Referring to the embodiment of FIG. 14, the lists of the snapshots 1435, 1445, 1455, 1465, may not be identical and a smart selection algorithm exist may be applied. Each snapshot may get a snapshot ID, which may be an integer.

In some embodiments, the selection algorithm may keep the snapshot list with at most 1000 entries. When a new entry arrives, the selection algorithm may remove one entry from the list. The entry that may be removed may be the one with the lowest priority. In some embodiment, user bookmarks have the highest priority. In other embodiments, system bookmark with odd bookmark IDs may have the lowest priority then snapshots with even id not dividable by 4, then not dividable by 8; this type of deletion may maintain an equal distance between bookmarks. In some embodiments, if all the bookmarks have the same priority, selection may be made to ensure that the distance between bookmarks in terms of data is almost the same; that the delta between bookmarks is minimized. In other embodiments, it may be stated that the 10 bookmarks most recent bookmarks may not allowed to be diluted.

The instant disclosure describes, in an embodiment, a virtual consistency group. In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 15 shows Program Logic 1534 embodied on a computer-readable medium 1530 as shown, and wherein the Logic is encoded in computer-executable code configured for carrying out the reservation service process of this invention and thereby forming a Computer Program Product 1510.

The logic for carrying out the method may be embodied as part of the system described below, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in a data replication environment, the data replication environment comprising a plurality of data protection appliances, each data protection appliance of the plurality of data protection appliances comprising a journal, the method comprising:
    creating a virtual consistency group comprising a virtual journal and the plurality of data protection appliances; wherein the virtual consistency group is configured to replicate a production volume;
    dividing the production volume and virtual journal of the virtual consistency group into segments; wherein each segment corresponds to a portion of the production volume and a portion of the virtual journal; and
    assigning each data protection appliance of the plurality of data protection appliances of the virtual consistency group to a segment of the virtual consistency group; where each data protection appliance replicates the assigned segment of the production volume.

2. The method of claim 1 further comprising:
    reading, at each data protection appliance, the portions of a marking stream corresponding to assigned segment of the virtual consistency group; wherein the marking stream denoting dirty areas of a marking stream, the dirty areas denoting changed portions of the replication.

3. The method of claim 2 further comprising:
    recording what portions of the marking stream have been read.

4. The method of claim 1 further comprising:
    receiving all IO split by a protection agent from a data replication sent to the virtual consistency group at a single data appliance of the plurality of data appliances and the consistency group farther sending the IO to the relevant one or more consistency groups relevant for it.

5. The method of claim 1 further comprising:
    creating a replicated image at a time T; the creation of the replicated image comprising:
        sending each relevant consistency group timestamp indicating time T; wherein each consistency group uses its journal to roll its replicated portion to the time T as indicated by the timestamp; and
        combining the images from each of the plurality of appliances;
    presenting the combined image as the replicated image at time T.

6. The method of claim 4 further comprising:
    sending, from a single data appliance of the plurality of data appliances, a timestamp;
    receiving, at each data appliance of the plurality of data appliances, the time stamp;
    entering, at each data appliance of the plurality of data appliances, a bookmark in the journal of the data appliance corresponding to the timestamp.

7. The method of claim 1 wherein a first data protection appliance of the plurality of data protection appliances receives IO to be replicated for the production volume and wherein the method further comprises:
    sending, from the first data protection appliance to each of the other data protection appliances, the IO corresponding to the assigned segment of the protection volume replicated by the each of the other data protection appliances.

8. The method of claim 7 further comprising:
    storing, at each of the other data protection appliances, the IO in the portion of the virtual journal assigned to each of the other data protection appliances.

9. A program product for use in a data replication environment, the data replication environment comprising a plurality of data protection appliances, each data protection appliance of the plurality of data protection appliances comprising a journal, the program product comprising
    a computer-readable non-transitory storage medium encoded with computer-executable program code enabling:
    creating a virtual consistency group comprising a virtual journal and the plurality of data protection appliances; wherein the virtual consistency group is configured to replicate a production volume;
    dividing the production volume and virtual journal of the virtual consistency group into segments;
    wherein each segment corresponds to a portion of the production volume and a portion of the virtual journal; and assigning each data protection appliance of the plurality of data protection appliances of the virtual consistency group to a segment of the virtual consistency group;

where each data protection appliance replicates the assigned segment of the production volume.

10. The program product of claim 9 further enabling:

reading, at each data protection appliance, the portions of a marking stream corresponding to assigned segment of the virtual consistency group; wherein the marking stream denoting dirty areas of a marking stream, the dirty areas denoting changed portions of the replication.

11. The program product of claim 10 further enabling:

recording what portions of the marking stream have been read.

12. The program product of claim 9 further enabling:

receiving all IO split by a protection agent from a data replication sent to the virtual consistency group at a single data appliance of the plurality of data appliances and the consistency group farther sending the IO to the relevant one or more consistency groups relevant for it.

13. The program product of claim 9 further enabling:

creating a replicated image at a time T; the creation of the replicated image comprising:

sending each relevant consistency group timestamp indicating time T; wherein each consistency group uses its journal to roll its replicated portion to the time T as indicated by the timestamp; and combining the images from each of the plurality of appliances;

presenting the combined image as the replicated image at time T.

14. The program product of claim 12 further enabling:

sending, from a single data appliance of the plurality of data appliances, a timestamp;

receiving, at each data appliance of the plurality of data appliances, the time stamp;

entering, at each data appliance of the plurality of data appliances, a bookmark in the journal of the data appliance corresponding to the timestamp.

15. A system for use in a data replication environment, the system comprising:

a plurality of data protection appliances, each data protection appliance of the plurality of data protection appliances comprising a journal; and computer-executable program code operating in memory, wherein the computer-executable program code is configured for execution of the following steps:

a computer-readable storage medium encoded with computer-executable program code enabling:

creating a virtual consistency group comprising a virtual journal and the plurality of data protection appliances;

wherein the virtual consistency group is configured to replicate a production volume;

dividing the production volume and virtual journal of the virtual consistency group into segments; wherein each segment corresponds to a portion of the production volume and a portion of the virtual journal; and assigning each data protection appliance of the plurality of data protection appliances of the virtual consistency group to a segment of the virtual consistency group;

where each data protection appliance replicates the assigned segment of the production volume.

16. The system of claim 15 wherein the computer-executable program code is to execute the step of enabling:

reading, at each data protection appliance, the portions of a marking stream corresponding to assigned segment of the virtual consistency group; wherein the marking stream denoting dirty areas of a marking stream, the dirty areas denoting changed portions of the replication.

17. The system of claim 15 wherein the computer-executable program code is to execute the step of enabling:

recording what portions of the marking stream have been read.

18. The system of claim 15 wherein the computer-executable program code is to execute the step of enabling:

receiving all IO split by a protection agent from a data replication sent to the virtual consistency group at a single data appliance of the plurality of data appliances and the consistency group farther sending the IO to the relevant one or more consistency groups relevant for it.

19. The system of claim 15 wherein the computer-executable program code is to execute the step of enabling:

creating a replicated image at a time T; the creation of the replicated image comprising:

sending each relevant consistency group timestamp indicating time T; wherein each consistency group uses its journal to roll its replicated portion to the time T as indicated by the timestamp; and combining the images from each of the plurality of appliances;

presenting the combined image as the replicated image at time T.

20. The system of claim 17 wherein the computer-executable program code is to execute the step of enabling:

sending, from a single data appliance of the plurality of data appliances, a timestamp;

receiving, at each data appliance of the plurality of data appliances, the time stamp;

entering, at each data appliance of the plurality of data appliances, a bookmark in the journal of the data appliance corresponding to the timestamp.

* * * * *